United States Patent
Edwardson

[15] 3,666,245
[45] May 30, 1972

[54] DEVICE FOR MIXING A GAS CURRENT UNDER PRESSURE WITH AN ATOMIZED MIST OF LIQUID FLUID, SUCH AS LUBRICATING OIL

[72] Inventor: Svante Roland Edwardson, Solna, Sweden
[73] Assignee: AB Dentatus, Hagersten, Sweden
[22] Filed: Feb. 1, 1968
[21] Appl. No.: 702,404

[30] Foreign Application Priority Data

Feb. 14, 1967 Sweden..................................2066/67

[52] U.S. Cl..........................261/55, 184/55, 137/101.11, 123/196, 137/205.5, 239/337, 261/78, 252/352
[51] Int. Cl. .....................F16n 7/34, F16n 27/00, B01f 5/20
[58] Field of Search ...................261/78.1, 55; 239/584, 337, 239/591, 571, 364–371; 139/604; 184/55 A, 55, 56; 137/101.11, 205.5; 252/352 A; 123/196 R

[56] References Cited

UNITED STATES PATENTS

| 1,609,578 | 12/1926 | Scott | 239/584 X |
|---|---|---|---|
| 2,245,601 | 6/1941 | Medsker | 185/55 A |
| 2,304,644 | 12/1942 | Hettler | 184/55 A |
| 2,681,710 | 6/1954 | Streicker et al. | 184/55 A |
| 2,857,982 | 10/1958 | Schwartz | 184/55 A |
| 2,925,883 | 2/1960 | Everett | 261/78.1 X |
| 2,966,312 | 12/1960 | Wilson, Jr. et al. | 261/78.1 X |
| 3,023,849 | 3/1962 | Tine | 261/78.1 X |
| 3,044,574 | 7/1962 | Ferguson | 261/78.1 X |
| 3,086,616 | 4/1963 | Thomas | 184/55 A |
| 3,244,257 | 4/1966 | German et al. | 184/55 A |
| 1,074,867 | 10/1913 | Jones | 184/55 A |
| 3,515,676 | 6/1970 | Hierta et al. | 261/78 A X |
| 3,207,492 | 9/1965 | Zikesch | 261/118 X |

FOREIGN PATENTS OR APPLICATIONS 693,817 8/1965 Italy

*Primary Examiner*—Ronald R. Weaver
*Attorney*—Young & Thompson

[57] ABSTRACT

A device for mixing a gas current under pressure with an atomized mist of liquid, such as lubricating oil, having a casing partially filled with a supply of liquid, a through duct for the gas current, said duct extending through the casing and having a pressure reducing valve, a bypass for a partial gas current connecting the upstream side with the downstream side of the valve and including i.a. the unfilled portion of the casing, and a suction tube opening into a first atomization area in the bypass and adapted to discharge liquid drawn from the supply in the casing into the partial gas current flowing through the bypass, in which a second, controllable atomization area is provided connected in parallel with the valve in the through duct and in series with the first atomization area to introduce the partial gas current enriched by the liquid into the gas current flowing through the duct. The outlet opening of the bypass has a valve seat cooperating with a portion of the valve in a manner such as progressively to close the outlet of the bypass in response to opening movements of the valve.

3 Claims, 4 Drawing Figures

DEVICE FOR MIXING A GAS CURRENT UNDER PRESSURE WITH AN ATOMIZED MIST OF LIQUID FLUID, SUCH AS LUBRICATING OIL

This invention relates to a device for mixing a gas current under pressure with an atomized mist of liquid, such as lubricating oil, comprising a casing partially filled with a supply of liquid, a through duct for the gas current, said duct extending through the casing and having a pressure reducing restriction, a bypass for a partial gas current connecting the upstream side with the downstream side of the restriction and including i.a. the unfilled portion of the casing, and a suction tube opening into an atomization area in the bypass and adapted to discharge liquid drawn from the supply in the casing into the partial gas current flowing through the bypass.

An automatically operating device of this kind has been previously suggested for use in connection with compressed-air driven machines and tools for mixing the supplied air current with an atomized mist of lubricating oil which is entrained with the air current and conveyed to various bearings and the like to be lubricated. Besides this suggested automatic oil mist lubricator there exist other lubricators in which the oil mist is produced in a separate space and then admixed with the supplied air current. Such lubricators are collectively termed micro mist lubricators.

Prior-art oil mist lubricators have generally proved satisfactory in connection with machines and working tools having a constant air consumption, but they are not adequate to the requirements in tools or the like in which the air consumption frequently varies from one value to another value. In such tools difficulties are encountered because of the pressure drop or pressure drops in the lubricating device. If the prior-art oil mist lubricators are adjusted from the beginning to the average air consumption it often happens that they will not lubricate at all at the minimum air consumption and lubricate too much at a higher air consumption.

The object of this invention is to eliminate this inconvenience and to provide a device of the kind indicated in the preamble and constructed such that an initially determined pressure drop in the device will be maintained or changed as desired either such that the pressure drop is maintained constant irrespective of the amount of air supplied or such that the pressure drop is increased or decreased with increasing amount of air. In this way an accurate control of the supply of lubricant mist to the places to be lubricated is rendered possible.

In order to avoid the above named inconvenience and to attain the object of the invention the device according to the invention is characterized in its broadest aspect in that an additional, controllable atomization area is provided in the bypass of the through duct, said additional atomization area being connected in parallel with the restriction in the through duct and in series with the first named atomization area.

A suitable embodiment of the invention is characterized in that the additional atomization area is formed by a valve, such as a needle valve, provided in the outlet of the partial current into the through duct and adapted to be adjusted such that a pressure of a magnitude between the pressures on either side of the restriction in the through duct is obtained in the casing, whereby to effect control of the amount of fluid in the main gas current. The restriction in the through duct may be in the form of a spring-biased valve, the spring pressure being optionally adjustable by a control device in relation to the opening movement of the valve from a practically rectilinear characteristic to a more and more progressive characteristic so that the valve is more or less yielding to the main gas current in the duct in response to the adjustment of the spring, whereby to change the pressure drop across the restriction in relation to the characteristic of the spring pressure. Due to this arrangement the amount of liquid introduced into the main gas current in the form of a mist can be limited by changing the pressure drop in the device either by adjusting the valve at the outlet of the partial stream into the through duct or by varying, by means of the control device, the spring pressure acting on the restriction valve in the through duct.

The first named atomization area in the bypass is preferably formed by a hole in the wall of the through duct, a clearance being provided between the wall of said hole and the end of the suction tube opening in the direction of flow into the bypass.

If the clearance between the suction tube and the wall of the hole is suitably dimensioned a continuous flow of the liquid can be maintained all the time, resulting of course in a continuous atomization at the first named atomization area.

Upon increasing gas flow a constant or continuously decreasing supply of atomized fluid is obtained, the outlet opening of the bypass has a valve seat adapted to cooperate with a portion of the restriction valve member in the through duct in a manner such as to close the outlet of the bypass in response to opening movements of the restriction valve in the through duct, resulting in that a constant or continuously decreasing pressure drop is obtained between the upstream side of the restriction and the casing depending on the progressive or rectilinear characteristic of the spring pressure. The valve seat in the outlet opening of the bypass may be formed by the plane end surface of a member which optionally by means of treads is displaceable in the outlet opening and said plane end surface of which faces the through duct, said member having an axial duct the end of which remote from the through duct is in the form of a seat of the valve in the bypass. The portion of the restriction valve member cooperating with the valve seat in the outlet opening of the bypass is preferably formed by a plane surface on one side of the valve member.

In order to enable the device according to the invention to be conveniently assembled with a pressure regulator and a filter for the gas current so as to obtain a unit which has a single inlet connection piece and a single outlet connection piece and can be directly connected in a conduit for the gas current, the through duct may extend vertically through the casing in the embodiment of the invention. Further, a screen may be provided between the two atomization areas in the embodiment of the invention.

The invention will be described hereinafter with reference to the accompanying drawings, which show one embodiment thereof, and in which.

Figure 1:
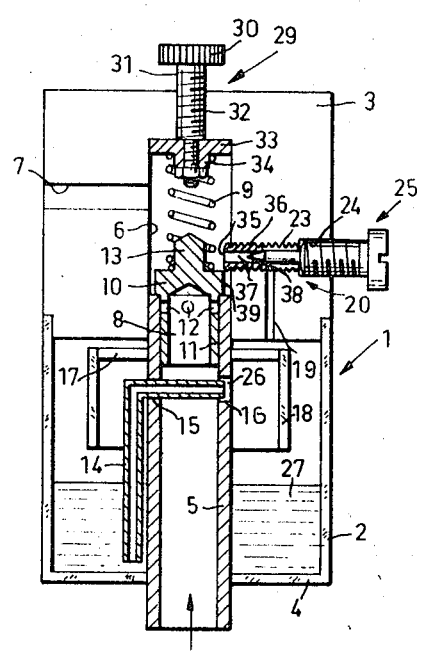
FIG. 1 is a longitudinal sectional view of the invention.

The embodiment illustrated in the drawing comprises a cylindrical casing 1 consisting of a substantially cup-shaped transparent lower part 2 and an upper part 3 tightly fitted like a cover to the lower part. The bottom 4 of the lower part 2 has a central hole through which a tube 5 tightly extends into the casing. The upper end of the tube is tightly received in a dead end hole 6 centrally disposed in the upper part 3. A hole 7 extends radially inwardly from the cylindrical surface of the upper part 3 and meets the hole 6 near the upper end thereof. The tube 5 and the holes 6 and 7 provide a through duct extending through the casing. Disposed in this through duct 5,6,7 is a restriction in the form of a suitable valve member 8. This valve member is in the form of a circular plate 10 which by means of a spring 9 is forced against the top end of the tube 5. The diameter of the plate 10 is smaller than that of the dead end hole 6. Depending from the plate is an annular portion 11 which projects into the tube 5 and the outside diameter of which is slightly smaller than the internal diameter of the tube 5. Near the plate 10 the annular portion 11 has holes 12 which upon removal of the plate 10 from the upper end of the tube are eventually uncovered so as to permit free flow through the tube 5, through the openings 12 uncovered by the tube 5, and through the holes 6 and 7. In the position shown the plate 10 is in contact with the upper end of the tube 5, and the openings 12 are closed. The spring 9 is a helical spring one end of which bears on the plate 10 and the other end of which bears on plate 33 the bottom of the dead end hole 6. In order to guide the spring 9 during compression thereof, the plate 10 is advantageously provided with a guide member in the form of an upstanding cylindrical pin 13 the diameter of which is slightly smaller than the internal diameter of the spring. Disposed at some distance below the upper part 3 and the annular portion 11 projecting into the tube 5 is a tube 14 which is considerably narrower than the tube 5 and extends through diametrically opposite holes 15 and 16 in the wall of the tube 5. The tube 14 has its lower end located slightly above the bottom 4 of the casing and extends substantially parallel to the tube 5 upwardly to the level of the holes 15 and 16 and is then bent substantially at right angles and fits tightly in the hole 15 and extends at its other end through the tube 5 and halfway through the hole 16 the diameter of which is greater than the outside diameter of the tube 14 so that a clearance 26 is provided between the wall of the hole 16 and the tube 14. In operation of the device the tube 14 serves as a suction tube and draws liquid from a supply filled to a certain permissible level in the casing and discharges this fluid at the outlet in the hole 16. A flange 17 is suitably secured around the tube 5 between the tube 14 and the upper part 3. The flange carries an annular screen 18 of a suitable transparent material. Provided in the lower portion of the upper part 3 is a bore or hole 19 which is substantially parallel to the central hole 6 in the upper part. A radial hole 20 in the upper part meets the upper or inner end of the hole 19 and opens into the hole 6 at some distance above the upper end of the tube 5 and the valve member 10, 11, 12, 13 provided in the tube 5. The threaded section 23 extends plug 36 a considerable distance beyond the inner end of the hole 19 and merges into an internally threaded outer section 24. Located in the hole 20 is a valve member in the form of a conventional needle valve 25, the pointed cone of which projects into the section plug 36. The inner end 38 of plug 36 provides a seat for this valve. The spindle of the needle valve is screwed into the section 24 so that the valve 25 which has a slotted head can be suitably adjusted in the hole 20 relative to the seat.

By means of connection pieces, not shown, provided at the outer ends of the tube 5 and the hole 7 the device illustrated can be inserted into a conduit through which gas under pressure, such as compressed air, can be supplied to a place of consumption. In operation, the gas or air current flows through the tube 5 and lifts the spring-biased valve member from the end of the tube and uncovers the openings 12 to an extent corresponding to the pressure of the air current so that the air can flow through the restriction effected by the holes 12 in the valve member and further through the holes 6 and 7 and the conduit to the place of consumption. As is well known in the art the restriction causes an increase of the velocity of the air current resulting in a pressure drop across the upstream and downstream side of the restriction. Because of this pressure drop part of the amount of air passing through the tube 5 will be branched off through the bypass formed by the clearance 26 in the hole 16, the portion of the casing 1 unfilled with liquid, the hole 19 and the section 23 and plug 36 of the hole 20. After having passed through the section 23 and plug 36 the partial air current will be reunited in the hole 6 with the main current flowing through the restriction. The partial air current through the bypass gives rise to an ejector action at the hole 16 resulting in a continuous suction in the tube 14 through which liquid in the casing will be drawn up. This liquid may be used for mist lubrication of the bearings in a pneumatically driven apparatus, in which case lubricating oil is continuously discharged and atomized into extremely small droplets at the outlet or hole 16 and in the form of a mist entrained in the partial air current through the rest of the bypass. Drops which at the first atomization area or hole 16 are too great to be suspended in the partial air current will either fall down directly into the oil supply by their own weight or be separated as the partial air current after having been mixed with the liquid in the hole 16 comes into contact with the annular screen 18 which forms a dropping place on which drops which are not sufficiently small to be susupended in the partial air current are deposited and eventually form sufficiently large and heavy drops which can fall down into the oil supply. The partial air stream enriched with a homogeneous mist of for instance lubrication oil passes then below screen 18, between the screen and the oil level 27 in the casing and further through the hole 19 to the needle valve 24 where the oil mist during its passage through the restriction formed between the pointed end of the needle valve and the end 38 serving as a seat is further atomized and thereupon flows out into the main air stream in the hole 6 and mixes with this stream. Thereupon the oil mist is entrained with the air current and passed to the places to be lubricated in the pneumatically driven apparatus.

From the above it will be seen that a device constructed in accordance with the basic embodiment illustrated mixes a gas current under pressure with a continuously supplied, atomized mist of a liquid. This device is especially suitable to be used for instance as a so called micro lubricator for pneumatically driven machines and tools. A device according to the invention is especially valuable because of the fact that it permits control of the amount of liquid supplied to the places of consumption by controlling the amount of atomized liquid in the form of a mist. By way of example, if the device according to the invention is used as a mist lubricator for a pneumatically driven hand tool, lubrication of the bearings of the tool can be maintained continuously and adjusted more accurately than in prior-art devices to the actual lubrication requirement at varying amounts of air and speeds of the tool. Conventional mist lubricators for certain pneumatically operated, mist lubricated machines and tools are generally adjustable to a mean value only, and sometimes it is not possible to obtain sufficient lubrication at the air consumption corresponding to the minimum speed, whereas at maximum speed and maximum air consumption lubrication is so excessive that oil sometimes is forced out of the machine or tool. In contrast thereto, a device according to the invention used in connection with the same machines and tools secures adequate lubrication at both minimum and maximum speed and air consumption.

Generally, control of the amount of liquid supplied in the form of mist is effected in a device according to the invention partly by means of the pressure reducing restriction in the through duct 5,6,7, and partly by means of the valve member, such as the needle valve 25, in the bypass. By means of the needle valve the pressure drop between the downstream part of the through duct and the casing is controlled. The clearance 26 between the wall of the hole 16 and the suction tube 14 should be sufficiently small to ensure a sufficient air velocity through the clearance for continuous suction and atomization of the liquid fluid even at minimum air consumption.

Figure 2:
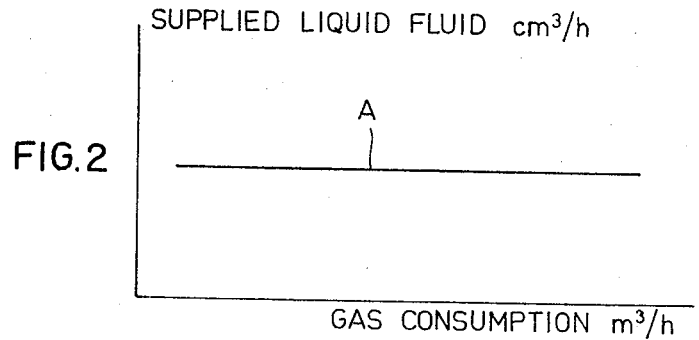
FIGS. 2–4 are diagrams illustrating the mode of operation thereof.

The spring 9 is very long as compared with the opening movement of the valve member with the result that the deflection of the spring per unit of load can be said to be substantially constant which means that the characteristic of the spring is linear. Provided that the adjustment of the needle valve 25 is not changed an at least substantially constant pressure drop will be maintained across the restriction upon increasing or decreasing gas or air consumption. The substantially constant pressure drop across the restriction in the through duct results in a likewise substantially constant pressure drop casing, the through duct and the asing, and due to the last named pressure drop the partial current through the bypass will be substantially constant irrespective of an increase or decrease of the gas or air consumption. Due to the constant partial stream a substantially constant amount of liquid per unit of time will be drawn up, atomized to mist, mixed with the main gas stream and carried thereby to the place of consumption irrespective of changes in the gas or air consumption. These conditions are illustrated in the diagram shown in FIG. 2 where the curve A represents the amount of liquid, such as oil, supplied per unit of time as a function of the gas consumption per unit of time in a device constructed in accordance with the basic embodiment. A change of the setting of the needle valve 25 results in a change of the pressure drop between the through duct and the casing and, consequently, as required, in an increase or decrease of the amount of the supplied atomized fluid in the form of mist. In order to change, for reasons to be explained hereinbelow, the normally substantially constant characteristic of the spring pressure to a more and more progressive characteristic, an adjustable control device 29 is provided in the upper part 3 of the casing 1 for compressing the spring 9 to a desired extent. The control device 29 consists of a threaded spindle 31 suitably provided with an adjusting knob 30. The spindle is screwed from the top side of the casing into an internally threaded hole 32 in the bottom of the dead end hole 6. The diameter of the hole 32 is smaller than that of the hole 6. The spindle 31 extends into the upper end of the hole 6 and carries a circular supporting plate 33 the diameter of which is slightly smaller than that of the hole 6. On the side which faces the spring 9 in the hole 6 the supporting plate 33 has a guide member for the upper end of the spring which guide member is in the form of a cylindrical boss or the like 34. The spindle 31 should be long enought to permit a considerable compression of the spring 9 the upper end of which bears on the supporting plate 33 and is maintained thereon by the guide member or boss 34. A valve seat 35 provided in the outlet opening of the bypass. This valve seat is adapted to cooperate with a portion of the valve member 8 in the through duct according as the holes 12 in the valve member 8 are opened upon increasing gas consumption whereas the outlet opening of the bypass is closed. Depending on the progressive or rectilinear characteristic of the spring pressure the result is a constant or continuously decreased pressure drop between the upstream side of the restriction in the trough duct and the casing and a constant or continuously decreased supply of atomized liquid mist upon increasing gas consumption. In case of reduced air consumption the operation is of course reversed. The valve seat 35 is formed by the plane end face of a member displaceable in the outlet opening of the bypass, said end face extending slightly into the through duct. The displaceable member may be of any desired shape and is represented by a cylindrical plug 36 having an axial duct 37 of suitable cross-sectional form. The plug 36 is suitably externally threaded throughout its length and engages the internally threaded section 23 of the hole 20. At the end 38 remote from the through duct the plug 36 has suitably a hold for a tool, such as a slot for a conventional screw driver.

According to the desired function of the device according to the invention the plug 36 can be readily screwed more or less into the hole 20. The plug can be screwed inwardly to such an extent that its end 35 serving as the valve seat upon displacement of the valve member 8 in the through duct comes into contact with a plane face 39 of the valve member. Also, the plug can be screwed outwards out of contact with the valve member 8. Upon movement of the valve member depending on the magnitude of the gas consumption the plane face 39 of the valve member 8 will move along the valve seat 35 and uncover or close the outlet opening 37 of the bypass to an extent corresponding to the movement of the valve member 8. In the inwardly as well as outwardly screwed positions of the plug 36 the end 38 thereof located nearest the hole 19 serves as a seat for the needle valve 25. If the plug 36 is to be screwed more inwardly or outwardly the needle valve 25 has to be temporarily removed from the hole 20.

The mode of operation of the device illustrated is as follows. If the plug 36 is screwed in an outward direction so that its end or valve seat 35 will not come into contact with the valve member 8 and if the needle valve 25 is again inserted and adjusted in the hole 20 and if the spring 9 is not at all compressed by the control device 29, the gas or air current will be mixed with a substantially constant amount per unit of time of atomized liquid mist, such as oil mist, irrespective of increasing or decreasing gas or air consumption. The result is a supply of atomized liquid mist represented in the diagram shown in FIG. 2.

Figure 3:
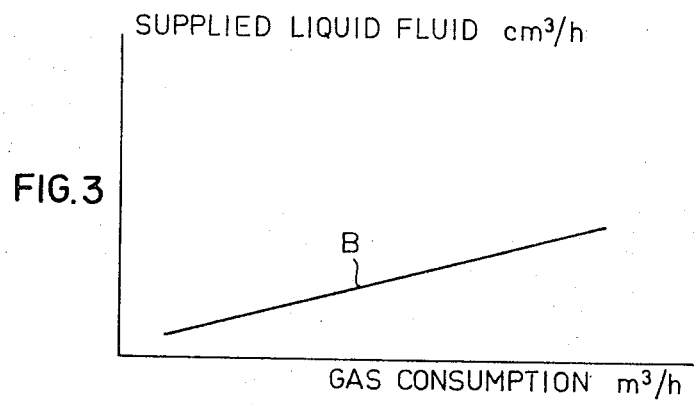

However, if the spring 9 is compressed by means of the spindle 31 of the control device 29 the pressure exerted by the spring 9 on the valve member 8 will have a progressive characteristic resulting in a more and more increased resistance to the opening movement of the valve member and to the uncovering of the holes 12 upon increasing gas or air consumption. Consequently, the restriction effect in the through duct will be relatively increased and the pressure drop across the restriction and between the upstream side of the restriction and the casing will also be increased in relation to the characteristic of the spring pressure. Consequently, the amount of the partial current through the bypass and the supply of atomized fluid mist to the gas or air current will be increased with increasing gas or air consumption. The gas or air current will be automatically mixed with an increasing or decreasing amount of atomized liquid mist per unit of time upon increase or decrease of the air or gas consumption as illustrated in the diagram shown in FIG. 3. The inclination of the curve B in FIG. 3 can be varied by varying the characteristic of the spring pressure by means of the control device 29.

Figure 4:
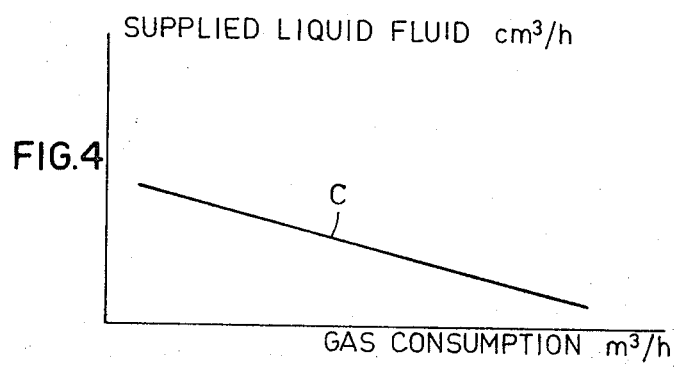

If the plug 36 is screwed inwardly to such an extent as to come into contact with the portion 39 of the valve member 8 the following will happen as a gas or air stream passes through the duct 5,6,7. According as the valve member 8 is displaced by the main gas current and the openings 12 are more and more uncovered the portion 39 of the valve member will more and more close the outlet opening of the bypass, i.e. the duct 37 through the plug 36. Depending on the progressive or rectilinear characteristic of the spring pressure adjustable by the control device 29 a constant or continuously decreasing pressure drop will be obtained between the upstream side of the restriction in the through duct and the casing, and consequently, a constant or continuously decreasing amount per unit of time of atomized liquid mist, such as oil mist, will enter the main gas stream upon increasing gas or air consumption. The diagram in FIG. 4 shows how the supply of liquid fluid is reduced with increasing gas consumption. The curve C will be more inclined if the characteristic of the spring pressure is substantially linear. In that case the pressure drop between the casing and the upstream side of the restriction will decrease the most. According as the spindle 31 is screwed inwards the characteristic of the spring pressure will become more progressive, and the pressure drop between the upstream side of the restriction and the casing will no longer decrease to the same degree. The curve C will be less inclined but will be displaced in the direction of the axis of the ordinates. However, this displacement can be compensated for by the needle valve 25 by means of which the pressure drop between the upstream side of the restriction and the casing can be restored.

Many modifications of the devices described are conceivable within the scope of the appending claims.

I claim:

1. A device for mixing a gas current under pressure with an atomized mist of liquid, such as lubricating oil, comprising a casing to receive a supply of liquid that partially fills the casing, a through duct for the gas current, said duct extending through the casing and having a pressure-reducing restriction therein, a bypass for a partial gas current connecting the upstream side with the downstream side of said restriction and including the normally unfilled portion of the casing, a suction tube opening into a first atomization zone in the bypass and discharging liquid drawn from the supply in the casing into the partial gas current flowing through the bypass, and adjustable valve means in said bypass providing a controllable second atomization zone downstream from said first atomization zone, said restriction in the through duct being formed by spring-biased valve means, the outlet opening of the bypass having a valve seat cooperating with a portion of the valve forming the restriction in the through duct to progressive close the outlet of the bypass in response to opening movements of the valve in the through duct.

2. A device as claimed in claim 1, in which the valve seat is formed by the end surface of a member which is displaceable in said outlet opening and said end surface of which faces the through duct, said member having an axial duct, the end of which, remote from the through duct, is a valve seat for said adjustable valve means.

3. A device as claimed in claim 1, in which said portion of the valve in the through duct cooperating with the valve seat in the outlet opening of the bypass is formed by a surface on one side of the valve in the through duct.

* * * * *